United States Patent
Sertier

[11] Patent Number: 6,123,511
[45] Date of Patent: Sep. 26, 2000

[54] FUEL SUPPLYING APPARATUS FOR DRAWING OFF FUEL FOR A MOTOR VEHICLE TANK HAVING A JET PUMP DEFLECTOR FOR PRIMING

[75] Inventor: Bruno Sertier, Chalon-en-Champagne, France

[73] Assignee: Marwal Systems, France

[21] Appl. No.: 09/269,465

[22] PCT Filed: Sep. 24, 1997

[86] PCT No.: PCT/FR97/01673

§ 371 Date: Mar. 25, 1999

§ 102(e) Date: Mar. 25, 1999

[87] PCT Pub. No.: WO98/13223

PCT Pub. Date: Apr. 2, 1998

[30] Foreign Application Priority Data

Sep. 26, 1996 [FR] France .................................. 96 11740

[51] Int. Cl.[7] .................................................. F04B 23/08
[52] U.S. Cl. .......................... 417/87; 123/509; 123/514
[58] Field of Search .............................. 417/87; 123/509, 123/514

[56] References Cited

U.S. PATENT DOCUMENTS

| | | | |
|---|---|---|---|
| 723,531 | 3/1903 | Jackson | 123/514 |
| 1,698,619 | 1/1929 | Blow | 123/514 |
| 3,497,134 | 2/1970 | Horn | 123/509 |
| 5,046,471 | 9/1991 | Schmid | 123/509 |
| 5,050,567 | 9/1991 | Suzuki | 123/514 |
| 5,070,849 | 12/1991 | Rich et al. | 123/509 |
| 5,218,942 | 6/1993 | Coha et al. | 123/514 |
| 5,289,810 | 3/1994 | Bauer et al. | 123/510 |
| 5,396,872 | 3/1995 | Ruger et al. | 123/514 |
| 5,636,616 | 6/1997 | Okane et al. | 123/514 |
| 5,797,373 | 8/1998 | Kleppner et al. | 123/495 |
| 5,873,349 | 2/1999 | Tuckey et al. | 123/514 |
| 5,893,354 | 4/1999 | Detweiler et al. | 123/520 |
| 5,960,775 | 10/1999 | Tuckey | 123/509 |

FOREIGN PATENT DOCUMENTS

| | | |
|---|---|---|
| 2849461 | 5/1980 | Germany. |
| 3914081 | 11/1990 | Germany. |
| 4335858 | 4/1995 | Germany. |
| 4336060 | 4/1995 | Germany. |
| WO9325403 | 12/1993 | WIPO. |

*Primary Examiner*—Charles G. Freay
*Assistant Examiner*—Robert Z. Evora
*Attorney, Agent, or Firm*—Blakely Sokoloff Taylor & Zafman

[57] ABSTRACT

An apparatus for drawing off fuel for a motor vehicle tank, the apparatus being of the type comprising a secondary reserve (20) suitable for being placed in a main tank (10), main pump (30) suitable for drawing fuel from the reserve (20), and auxiliary pump (40) of the jet pump type suitable for drawing fuel from the main tank and for transferring it to the secondary reserve (20). The body (41) of the jet pump (40) is angularly positioned to be vertical, with its outlet facing upwards.

18 Claims, 2 Drawing Sheets

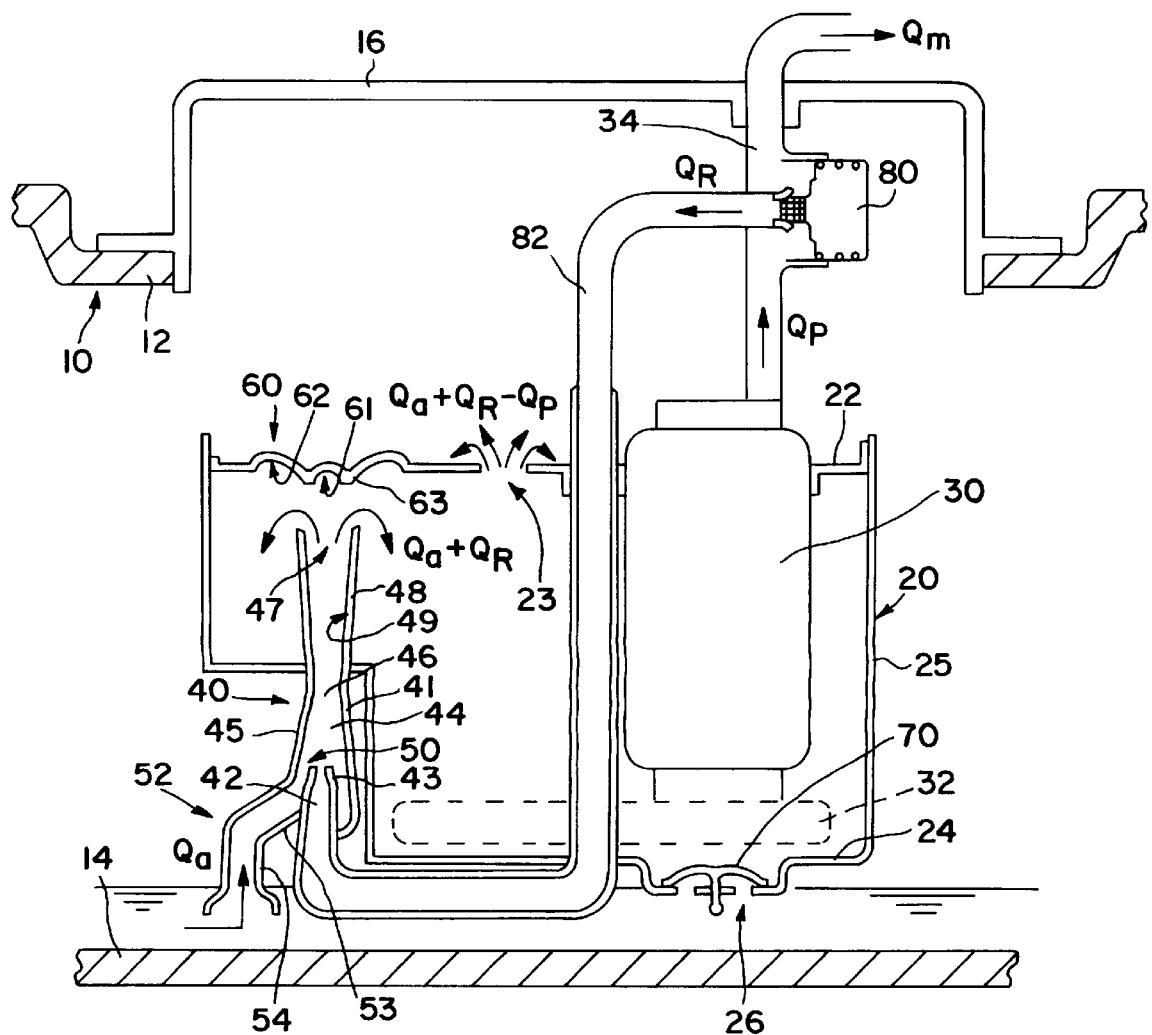
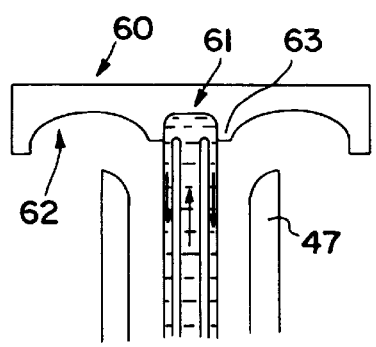 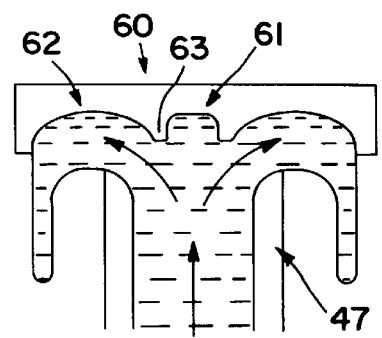

FUEL SUPPLYING APPARATUS FOR DRAWING OFF FUEL FOR A MOTOR VEHICLE TANK HAVING A JET PUMP DEFLECTOR FOR PRIMING

CROSS-REFERENCES TO RELATED APPLICATIONS

This application is a 371 of PCT/FR97/01673 filed on Sep. 24, 1997.

BACKGROUND OF THE INVENTION

1. Field of the Invention

The present invention relates to apparatus for drawing off fuel for motor vehicle tanks.

More precisely, the present invention relates to apparatus for drawing off fuel and that comprises:

a secondary reserve suitable for being placed in a main tank;

main pumping means suitable for drawing fuel from the reserve; and auxiliary pumping means of the jet pump type suitable for drawing fuel from the main tank and for transferring it to the secondary reserve.

2. Prior Art

Numerous items of apparatus of the above-mentioned type have been proposed for drawing off fuel.

An object of the present invention is to improve known drawing-off apparatus.

SUMMARY OF THE INVENTION

The present invention achieves this object by means of drawing-off apparatus of the type defined in claim 1, which is defined in the form of a preamble and of a characterizing portion relative to document WO-A-93/25403, and comprises apparatus for drawing off fuel for a motor vehicle tank, the apparatus being of the type comprising:

a secondary reserve (20) suitable for being placed in a main take (10);

main pumping means (30) suitable for drawing fuel from the reserve (20); and auxiliary pumping means (40) of the jet pump type suitable for drawing fuel from the main tank and for transferring it to the secondary reserve (20), the body (41) of the jet pump (40) being angularly positioned to be vertical, with its outlet facing upwards;

said apparatus being characterized by the fact that it further comprises a deflector (60) placed facing the outlet (47) of the jet pump (40) so as to return the fuel coming from the nozzle of the jet pump (40) to the inside of the venturi thereof, so as to facilitate priming the jet pump, when the flow injected into the jet pump (40) is at a rate lower than a threshold, the deflector (60) being provided with a substantially hemispherical cavity (61) that is coaxial with the outlet (47) of the jet pump and that is concave facing said outlet.

The present invention also provides tanks equipped with such drawing-off apparatus.

BRIEF DESCRIPTION OF THE DRAWINGS

The invention, together with the objects and advantages thereof, may best be understood by reference to the following detailed description given with reference to the accompanying drawings which are given by way of non-limiting example, and in which:

FIG. 1 is a diagrammatic vertical section view of apparatus of the present invention;

FIG. 2 is a vertical section view of the deflector and of the outlet of a shaped-jet pump of the present invention, the jet pump having two outlet flow regimes;

FIG. 3 is a vertical section view of the deflector and of the outlet of a shaped-jet pump of the present invention, the jet pump having two outlet flow regimes;

DETAILED DESCRIPTION OF THE INVENTION

Figure 4:
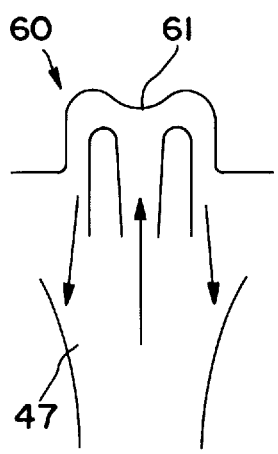
FIG. 4 is a diagrammatic vertical section of a variant embodiment of the deflector of the present invention.

FIG. 1 shows fuel-drawing-off apparatus placed in a main tank 10, and comprising a secondary reserve 20, main pumping means 30, and auxiliary pumping means 40.

The tank 10 is shown in fragmentary manner only in FIG. 1. More precisely, FIG. 1 shows the top wall 12 and the bottom wall 14 of the tank 10 in fragmentary manner. In practice, numerous configurations are possible for the tank 10.

The secondary reserve 20 is formed by a bowl disposed in the main tank 10 in the vicinity of the bottom 14 thereof, and supported in the main tank 10 by any suitable means. Optionally, the bowl 20 may be open at its top end. However, in the particular embodiment shown in FIG. 1, the bowl 20 is almost entirely closed at its top end. At its top, it is provided with a substantially horizontal wall 22 which is provided with only one localized opening 23.

In FIG. 1, the bottom wall of the secondary reserve 20 is substantially horizontal and is referenced 24 while the top wall thereof is referenced 25.

Numerous configurations are also possible for the secondary reserve 20. In particular, the secondary reserve is not limited to the particular geometrical shape shown in FIG. 1.

The main pumping means 30 are preferably constituted by an electric pump. These main pumping means are organized to draw fuel from the secondary reserve 20, and to direct it to a point of use, i.e. a carburetor or an injector.

The main pumping means 30 are provided with a filter 32 at their inlet which is situated in the vicinity of the bottom of the secondary reserve 20. They are also provided with a tube 34 at their outlet. The tube 34 passes through a plate or base 16 carried out by the top wall 12 of the tank. The tube 34 is then directed towards the point of use or the engine.

The auxiliary pumping means are formed by a jet pump designed to draw fuel from the main tank 10 in the vicinity of the bottom thereof, and to transfer the fuel to the secondary reserve 20.

In conventional manner, the jet pump 40 includes a venturi body (or mixer tube) 41. In the invention, the body 41 has its axis vertical. It is provided with a nozzle 42 which receives an injected flow rate QR. For example, the injected flow rate QR may come from a fuel return via which fuel not consumed by the engine is returned. In the non-limiting embodiment shown in FIG. 1, the injected flow rate QR comes from the outlet of a regulator 80 connected to the outlet tube 34. The outlet of the regulator 80 is connected to the nozzle 42 via a pipe 82. The regulator 80 is designed conventionally to direct excess fuel to the pipe 82 when the pressure in the tube 34 exceeds a predetermined threshold so as to maintain the pressure in the tube 34 at the rated pressure value. For this purpose, conventionally, the regulator 80 may, for example, comprise a diaphragm urged on one side by a rated spring, and on the other side by the pressure of the fuel in the tube 34, which diaphragm drives a valve member so that said valve member, carried by the diaphragm, opens to enable fuel to escape to the pipe 82 when the fuel pressure in the outlet tube 34 exceeds the rated threshold of the spring urging the diaphragm.

In another variant, said flow rate QR injected into the nozzle 42 may come from an outlet stage of the pump 30.

The outlet of the nozzle 42 is situated in a chamber 44 of the body 41, and it is provided with a taper 43.

As shown in FIG. 1, the nozzle 42 is provided at the base of the reserve bowl 20 and the taper 43 opens out vertically upwards into the chamber 44. The taper 43 is coaxial with the chamber 44.

More precisely, the taper 43 formed at the outlet of the nozzle 42 is placed facing a second taper 45 provided in the body 41. The second taper 45 opens out into a mixer tube 46 connected to the outlet 47 of the jet pump via a diffuser 48 itself constituted, for example, by a flare 49 flaring towards the outlet 47. As indicated above, the nozzle 42, the taper 43, the chamber 44, the taper 45, the mixer tube 46, the outlet 47, the diffuser 48, and the flare 49 are, in the invention, centered on a vertical axis.

The body 41 further has a side inlet 50 which connects the chamber 44 to the bottom of the main tank 10 outside the secondary reserve 20. The side inlet 50 opens out into the chamber 44 between the taper 43 provided at the outlet of the nozzle 42 and the second taper 45 formed in the chamber 44.

In the invention, the side inlet 50 is connected to a pipe 52 provided with a bend. The pipe 52 comprises a first segment 53 adjacent to the body 41 and sloping downwards away from the side inlet 50, and a second segment 54 which extends the first segment 53 vertically and opens out in the vicinity of the bottom of the main tank 10, e.g. in the form of a flared mouth, as shown in FIG. 1. In a variant, the pipe 52 provided with a bend as shown in FIG. 1 may be replaced with a sloping straight pipe connecting the side inlet 50 to the bottom of the tank.

The side inlet 50 receives a sucked-up flow rate Qa taken from the fuel tank 10.

In conventional manner, the outlet 47 delivers a transferred flow rate equal to the sum of the injected flow rate QR and of the sucked-up flow rate Qa.

According to another important characteristic of the invention, a deflector 60 is provided facing the outlet 47 of the jet pump 40.

The deflector is organized to return fuel coming from the jet pump back into the pump, during a priming stage, when the flow rate of the jet pump 40 is lower than a threshold.

Preferably, the defector 60 is provided with two coaxial cavities 61 and 63. The first or "central" cavity 61 is concave facing the outlet 47 of the jet pump 40 and coaxial with said outlet. For example, the first cavity 61 may be hemispherical.

Figure 5:
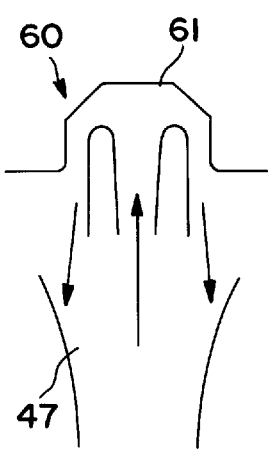
FIG. 5 is a diagrammatic vertical section view of a variant embodiment of the deflector of the present invention.
Figure 6:
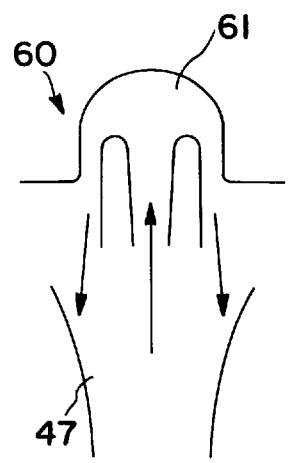
FIG. 6 is a diagrammatic vertical section view of a variant embodiment of the deflector of the present invention.

However, the invention is not limited to the first cavity 61 having this particular geometrical shape. For example, the cavity 62 may have an end wall that is at least slightly flattened, as shown in FIGS. 2 and 3, or else it may have an end wall that is provided with a projection as shown in FIG. 4, or that is polygonal in right section as shown in FIG. 5, and more generally that is concave in shape as shown in FIG. 6.

Preferably, the mean radius of the first cavity 61 is smaller than the radius of the outlet 47. Typically, and in non-limiting manner, the mean radius of the cavity 61 is about one half of the radius of the outlet 47.

The second or "outer" cavity 62 is annular, is also coaxial with the outlet 47, and is also concave facing said outlet.

Figure 8:
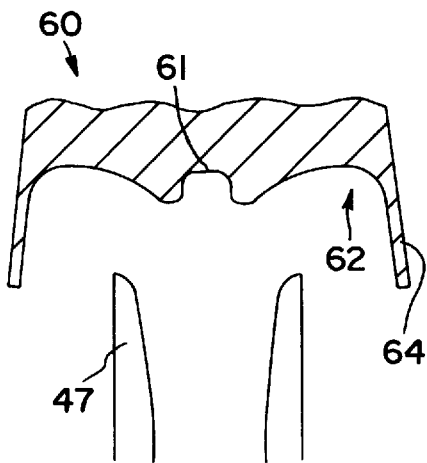
FIG. 8 is a diagrammatic vertical section view of a variant embodiment of the deflector of the present invention.

Preferably, the second cavity 62 is substantially half-torus shaped. Optionally, the cavity 62 may be extended at its periphery by a frustoconical or cylindrical skirt 64 as shown in FIG. 8, making it possible to deflect the transferred flow (the flow transferred after priming) towards the inside of the bowl forming the secondary reserve 20.

The radius of the innermost edge of the second cavity 62 is preferably smaller than the radius of the outlet 47, whereas the radius of the radially outermost edge of the same cavity 62 is larger than the radius of the outlet 47.

Preferably, the deflector 60 is formed in the top wall 22.

As shown in the accompanying figures, the end walls of the two coaxial cavities 61, 62 may be substantially coplanar, and situated in a horizontal plane extending transversely to the axis of the jet pump 40.

Figure 7:
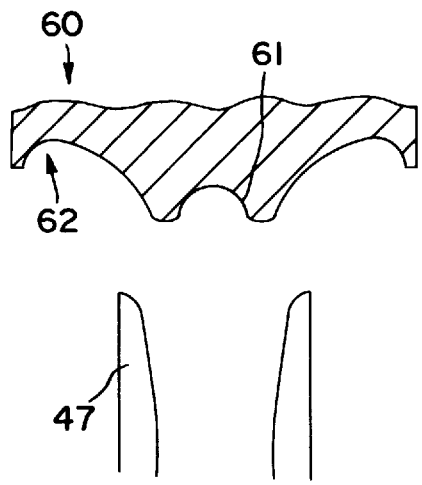
FIG. 7 is a diagrammatic vertical section view of a variant embodiment of the deflector of the present invention.

However, this characteristic is not essential. As shown in FIG. 7, is it possible to provide coaxial cavities 61, 62 that have non-coplanar end walls.

According to an advantageous characteristic of the invention, the annular space defined between the top free edge of the outlet 47 and the deflector 60 is of section substantially equal to or greater than the section of the outlet 47.

Furthermore, as shown in FIG. 1, the secondary reserve 20 is preferably provided with a valve member 70 in its bottom wall 24. In conventional manner, the valve member 70 is designed to prevent fuel from flowing freely from the secondary reserve 20 into the main tank 10 while allowing fuel to flow from the main tank 10 to the secondary reserve 20 when the level of fuel in the tank 10 is higher than the level in the secondary reserve 20 (e.g. on filling the tank).

In a manner known per se, the valve member 70 is designed to be pressed against the bottom wall 24 and therefore to close off an opening 26 formed therein when the level of fuel in the main tank is lower than the level in the secondary reserve 20. Conversely, the valve member 70 rises and opens up the opening 26 when the fuel level in the main tank 10 is higher than the level in the secondary reserve 20 (e.g. on filling the tank 10).

The person skilled in the art knows numerous valve member structures for this purpose. For this reason, the structure is not described in any more detail below.

The apparatus shown in FIG. 1 and described above essentially operates as follows.

The electric pump 30 delivers a fuel flow rate QP at its outlet.

With the engine consumption being referenced Qm, the return flow rate QR coming from the regulator 80 and directed towards the nozzle 42 is equal to Qp−Qm.

The flow rate at the outlet 47 of the jet pump 40 is equal to the sum of the flow rate Qa sucked into the main tank 10 via the pipe 52 and of the injected flow rate QR.

Finally, if necessary, the secondary reserve 20 delivers a fuel flow rate equal to Qa+QR−QP via the opening 23 provided in its top wall 22.

It should be noted that the drawing-off structure of the present invention as provided with a vertical venturi makes it possible to prevent the reserve bowl 20 from emptying without degrading suction performance.

Since the body 41 of the jet pump 40 is disposed vertically, there is no risk of said body emptying the secondary reserve 20 when the fuel level is lower than the free edge of the outlet 47 of the jet pump.

In addition, the deflector 60 of the present invention makes it possible to mitigate the venturi-priming problems encountered in certain conventional jet pumps.

In practice, it is observed that, in certain configurations, the jet from a venturi-effect pump is not capable on its own of creating suction in the venturi that is sufficient to enable the neck to be primed when said neck is initially emptied (when the level of fuel in the main tank is low).

In contrast, the deflector 60 of the present invention with its cavity 61 placed facing the outlet 47 of the venturi makes it possible to reflect the jet coming from the nozzle back into the venturi, as shown in FIG. 2, so as to make it easier for the fuel to rise inside the body 41 of the pump to the inlet of the mixer tube 46.

It should be noted that, in the context of the present invention, it is important for the central cavity 61 of the deflector to be coaxial with the nozzle 42, and more precisely with the jet coming from the nozzle 42, preferably as well as being coaxial with the outlet 47 of the jet pump. If this condition is not satisfied, the deflector 60 is less effective, and it becomes necessary to increase the return flow rate QR significantly in order to achieve the same performance. If said condition is satisfied, the jet reflected off the central cavity 61 of the deflector 60 is returned to the inside of the venturi tube of the jet pump 40.

By way of non-limiting example, for a nozzle 43 having an outlet diameter of 2 mm, the diameter of the central cavity 61 of the deflector 60 is about 5 mm, the cavity is exactly coaxial with the outlet 47, and the distance, in vertical projection, between the top of the outlet 47 of the jet pump and the bottom edge of the rib 63 defined between the two cavities 61, 62 is about 3 mm. Such a configuration leads to a required priming flow rate QR of about 20 liters per hour (l/h).

FIG. 2 shows a first operating stage corresponding to a priming stage, during which the central cavity 61 of the deflector 60 returns all of the fuel coming from the outlet 47 to the internal chamber 44 of the jet pump 40.

FIG. 3 shows a subsequent operating stage, after priming, during which subsequent stage fuel flows outwards into the secondary reserve 20 via the annular space defined between the outlet 47 of the jet pump 40 and the deflector 60. During this stage, the fuel is deflected radially outwards by the second annular cavity 62, and then deflected downwards at the periphery of the deflector.

Naturally, the invention is not limited to the particular embodiment described above, but rather it extends to any variant lying within the spirit of the invention.

Thus, for example, the inlet of the pipe 52 that communicates with the suction inlet 50 of the jet pump 40 may be provided with a pre-filter.

What is claimed is:

1. A fuel supply apparatus for drawing off fuel for a motor vehicle tank, the apparatus comprising:

a secondary reserve (20) placed in a main tank (10);

a main pumping means (30) for drawing fuel from the reserve (20); and a jet pump auxiliary pumping means (40) for drawing fuel from the main tank and for transferring the fuel to the secondary reserve (20), said jet pump having a body (41) with a venturi and the body (41) of the jet pump (40) being angularly positioned to be vertical, with its outlet facing upwards;

said apparatus further having a deflector (60) placed facing an outlet (47) of the jet pump (40) to return the fuel coming from a nozzle of the jet pump (40) to an inside of the venturi to facilitate priming the jet pump, when the flow of fuel injected into the jet pump (40) is injected at a rate lower than a predetermined threshold, the deflector (60) being provided with a substantially hemispherical cavity (61) disposed coaxial with the outlet (47) of the jet pump, said hemispherical cavity being concave facing said outlet.

2. The fuel supply apparatus according to claim 1, wherein a suction inlet (50) of the jet pump (40) is connected to a pipe (52) which opens out in the vicinity of a bottom of the main tank (10).

3. The fuel supply apparatus according to claim 2, wherein the pipe (52) is provided with a bend, and it comprises a first segment (53) that is adjacent to the body (41) of the jet pump, said pipe slopes downwards away from the suction inlet formed in the body (41) of the jet pump, and the pipe is extended by a second segment (54) which is substantially vertical and which opens out in the vicinity of the bottom of the main tank (10).

4. The fuel supply apparatus according to claim 2, wherein the pipe (52) is provided with a pre-filter.

5. The fuel supply apparatus according to claim 1 wherein said cavity (61) of the deflector (60) has a mean radius smaller than a radius of the outlet (47) of the jet pump.

6. The fuel supply apparatus according to claim 1 wherein the mean radius of the cavity (61) of the deflector (60) is about one half of the radius of the outlet (47) of the jet pump.

7. The fuel supply apparatus according to claim 1 wherein the deflector (60) is provided with a first cavity (61) that is central on the deflector, said first cavity being coaxial with the outlet (47) of the jet pump, and said first cavity being concave facing said outlet of the jet pump, and the deflector is further provided with a second cavity that is annular, said second cavity being also coaxial with the outlet (47) of the jet pump (40), and said second cavity being disposed outside the first cavity (61).

8. The fuel supply apparatus according to claim 7, wherein the annular second cavity (62) is substantially half-torus shaped.

9. The fuel supply apparatus according to claim 7 wherein a radius of a radially innermost edge of the annular second cavity (62) is smaller than a radius of the outlet (47) of the jet pump, and a radius of a radially outermost edge of said annular second cavity is larger than the radius of said outlet (47) of the jet pump.

10. The fuel supply apparatus according to claim 7, wherein end walls of two cavities (61, 62) of the deflector (60) are substantially coplanar.

11. The fuel supply apparatus according to claim 1 wherein the deflector (60) is carried by a wall (22) fixed to a top end of the secondary reserve (20).

12. The fuel supply apparatus according to claim 1 wherein a section of an annular space defined between the outlet (47) of the jet pump and the deflector (60) is substantially equal to or greater than a section of the outlet (47) of the jet pump.

13. The fuel supply apparatus according to claim 1 wherein the jet pump (40) has a nozzle (43) whose outlet diameter is 2 mm, and the deflector (60) has a central cavity (61) concave facing the outlet (47) of the jet pump and coaxial with said outlet of the jet pump, which central cavity has a diameter of 5 mm, a vertical distance between a free edge of the outlet (47) of the jet pump and a facing edge of the deflector (60) being 3 mm.

14. The fuel supply apparatus according to claim 1 wherein the secondary reserve (20) has a valve member (70) designed to prevent fuel from flowing from the secondary reserve (20) to the main tank (10) while allowing fuel to flow freely from the main tank (10) to the secondary reserve (20).

15. The fuel supply apparatus according to claim 1 wherein the jet pump (40) is fed with fuel coming from a return from the engine.

16. The fuel supply apparatus according to claim 1 wherein an outer annular cavity (62) of the deflector (60) is provided at its periphery with a skirt (64) to deflect a transferred flow to an inside of a secondary reserve.

17. The fuel supply apparatus according to claim 1 wherein the jet pump is fed with fuel coming from a regulator placed at the outlet of the main pumping means.

18. The fuel supply apparatus according to claim 1 wherein the jet pump is fed with fuel coming from an outlet stage of said main pumping means.

* * * * *

UNITED STATES PATENT AND TRADEMARK OFFICE
CERTIFICATE OF CORRECTION

PATENT NO.    : 6,123,511
DATED         : September 26, 2000
INVENTOR(S)   : Sertier It is certified that error appears in the above-identified patent and that said Letters Patent is hereby corrected as shown below:

<u>Title page,</u>
Item [75], Inventor, delete "Chalon-en-Champagne and insert
-- Chalons-en-Champagne --.

<u>Column 2,</u>
Line 9, in Brief Description of Drawings, at FIG 4, after "vertical section" insert -- view --.

Signed and Sealed this

Second Day of October, 2001

*Attest:*

NICHOLAS P. GODICI
*Attesting Officer*    *Acting Director of the United States Patent and Trademark Office*